P. READING.
FERTILIZER DISTRIBUTING ATTACHMENT FOR CULTIVATORS.
APPLICATION FILED SEPT. 9, 1913.
1,185,242. Patented May 30, 1916.
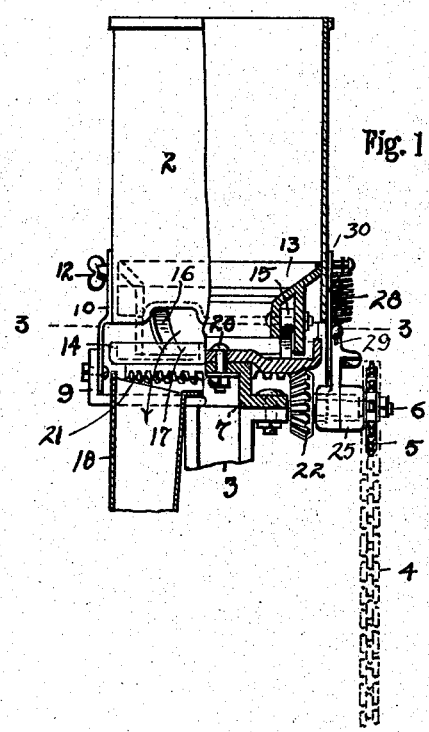
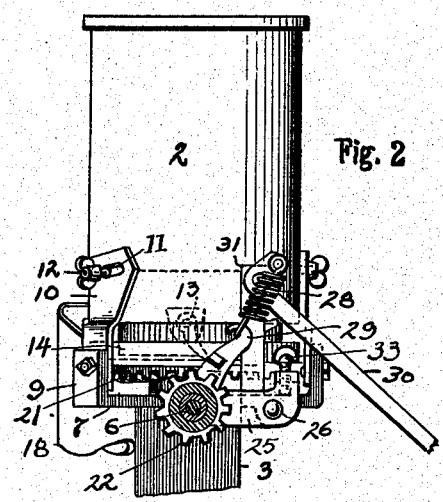
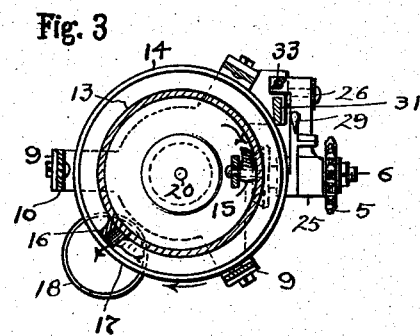
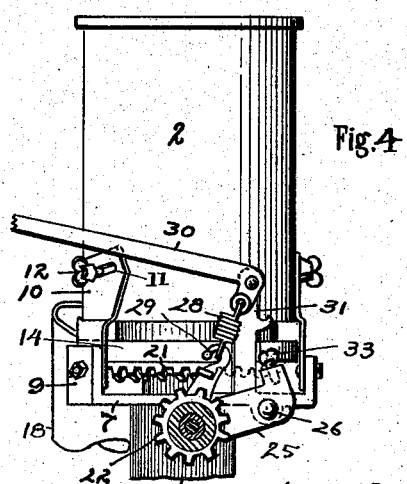
INVENTOR
PETER READING
BY Fisher & Moser
ATTYS
ATTEST

UNITED STATES PATENT OFFICE.

PETER READING, OF AKRON, OHIO, ASSIGNOR TO THE AKRON CULTIVATOR COMPANY, OF AKRON, OHIO, A CORPORATION.

FERTILIZER-DISTRIBUTING ATTACHMENT FOR CULTIVATORS.

1,185,242.     Specification of Letters Patent.     Patented May 30, 1916.

Original application filed December 9, 1912, Serial No. 735,841. Divided and this application filed September 9, 1913. Serial No. 788,925.

*To all whom it may concern:*

Be it known that I, PETER READING, citizen of the United States, residing at Akron, in the county of Summit and State of Ohio, have invented certain new and useful Improvements in Fertilizer-Distributing Attachments for Cultivators, of which the following is a specification.

This application is a division of my application for an improvement in fertilizer distributing attachment for cultivators, filed December 9, 1912, Ser. No. 735,841, and the invention comprises the construction and arrangement of parts substantially as hereinafter shown and described and particularly pointed out in the claim.

In the accompanying drawings, Figure 1 is a side view, partly sectioned away, of a fertilizer distributer for cultivators, and Fig. 2 is a side elevation projected from Fig. 1. Fig. 3 is a cross section of the distributer on line 3—3, Fig. 1. Fig. 4 is a similar view to Fig. 2, but showing the gears out of mesh.

In the application above referred to I show and describe a cultivator of the pivot axle type with fertilizer distributers mounted on swinging arms at the side of the wheels and driven by sprocket chains from the wheels, but the present invention is not necessarily confined to such an arrangement of parts and may be mounted and driven in any other suitable and practical way.

In detail, the invention comprises a receptacle 2 which is rigidly fixed upon a suitable support 3 forming a fixed or movable part of the cultivator, it being understood that the bottom of the receptacle is elevated to such position in respect to the wheel of the cultivator that working connections for the receptacle can be made with the wheel. As shown a sprocket chain 4 affords the working connection, this chain running over a sprocket wheel 5 on the shaft 6 which operates the rotatable feed bottom in the said receptacle.

A bracket 7 is fixed upon support 3 and has arms with upturned ends 9 upon which the receptacle 2 is rigidly supported by the extensoins 10 from said arms and which extensions have inclined slots 11 at their top and bolts 12 through same and the side of the receptacle to fix the receptacle in place. The said slots provide for rotary adjustment of the receptacle to different elevations.

The receptacle is shown as having a funnel-shaped casting 13 fixed therein, and a dish-shaped or flanged bottom 14 is rotatably supported on bracket 7 beneath said casting 13 and apart from the same say a fourth of an inch, more or less, adjustment being afforded by the receptacle itself. The flange of rotatable bottom 14 stands apart from the depending neck of said casting 13 about an inch all around to gather fertilizer in said outer space from within the receptacle. The feed from the inside need not be rapid and is effected by means of a deflector comprising a pivoted stirrer or finger 15 located inside the receptacle and engaging the top surface of the dish bottom 14, and the fertilizer thereon so as to promote its working out into the peripheral open space outside in said bottom 14. A second deflector comprising a plow 16, Fig. 1, is fixed in a recess on the outside of casting 13 and extends into the outer space in bottom 14 and operates to lift the fertilizer over the flange 17 and out into the delivery spout 18, where it goes to the earth in front of the inner cultivator teeth and near the plants under cultivation.

The bottom 14 is rotatably held in place by a central bolt 20 and has gear teeth 21 on its underside meshed by the miter gear 22 on shaft 8. The shaft 8 is supported in a bearing on arm 25 pivoted at 26 on the edge of bracket 7 and adapted to raise the gear 22 into mesh with gear 21 when the distributer is operated and to lower the same out of mesh when not in operation. To this end a spring link connection 28 is made with a hook 29 at the side of said arm, and a hand lever 30 pivoted on post 31 has a crank projection to which said spring is attached and by which the said lever can be thrown over the center of its pivot in either direction to hold said shaft and gear up in one position, Fig. 2, and to place said gears out of mesh in another position, see Fig. 4.

In operation the flanged bottom member 14 having gear teeth 21 on its lower side is rotated while the bracket 7 and the receptacle 2 with plow 16 and finger 15 are stationary. One object in using a spring link 28 is to provide a yielding engagement between the gears so that no injury will result to the device in operation. A set screw 33 carried by pivoted arm 25 limits the working depth of the teeth of the gears 21 and 22.

What I claim is:

A fertilizer attachment for cultivators having a tubular fertilizer receptacle and a substantially funnel-shaped part in the lower portion thereof having a deflector for the fertilizer pivoted on its lower inside portion, a rotatable bottom having a comparatively narrow continuous flange outside of and apart from the bottom portion of said funnel-shaped part and having said deflector operatively engaging the bottom thereof, a plow fixed to the outside of said funnel shaped part and arranged to work between the same and the inside of said narrow flange and adapted to throw the fertilizer over the flange.

In testimony whereof I affix my signature in presence of two witnesses.

PETER READING.

Witnesses:
ADESKE C. WYCKOFF,
H. M. HOUSER.

Copies of this patent may be obtained for five cents each, by addressing the "Commissioner of Patents, Washington, D. C."